United States Patent [19]

Killat et al.

[11] 4,397,930

[45] Aug. 9, 1983

[54] RECORD CARRIER FOR DEFORMATION IMAGES

[75] Inventors: Ulrich Killat, Hamburg; Gert Rabe; Hans J. Schmitt, both of Pinneberg, all of Fed. Rep. of Germany

[73] Assignee: U.S. Philips Corporation, New York, N.Y.

[21] Appl. No.: 198,096

[22] Filed: Oct. 17, 1980

Related U.S. Application Data

[63] Continuation of Ser. No. 941,178, Sep. 11, 1978, abandoned.

[30] Foreign Application Priority Data

Sep. 10, 1977 [DE] Fed. Rep. of Germany ....... 2740835

[51] Int. Cl.³ ............................................ G03G 5/028
[52] U.S. Cl. .......................................... 430/50; 430/66
[58] Field of Search ........................ 430/31, 50, 66, 67

[56] References Cited

U.S. PATENT DOCUMENTS 3,980,476 9/1976 Wysocki ............................... 430/50
4,021,236 5/1977 Sheridon et al. ..................... 430/50

Primary Examiner—John E. Kittle
Assistant Examiner—John L. Goodrow
Attorney, Agent, or Firm—Thomas A. Briody; Robert T. Mayer; Algy Tamoshunas

[57] ABSTRACT

The record carrier according to the invention comprises a substrate on which an electrode is provided which, on the side remote from the substrate, has a low-ohmic photoconductive layer which is covered with a second transparent electrode which is provided wihh a thermoplastic layer. For storing information the electrodes are connected to a voltage source and the thermoplastic layer is charged electrostatically and exposed in known manner. Upon exposure of an area of the thermoplastic layer, the light will fall through the transparent electrode on the low-ohmic photoconductive layer. As a result of the current passage, Joulean heat is produced which heats the thermoplastic layer in the place of the exposed area and softens it thereby deforming the layer by electrostatic forces in accordance with the charge.

The thermoplastic layer may, in known manner, also have photoconductive properties or be provided with a further photoconductive layer.

7 Claims, 1 Drawing Figure

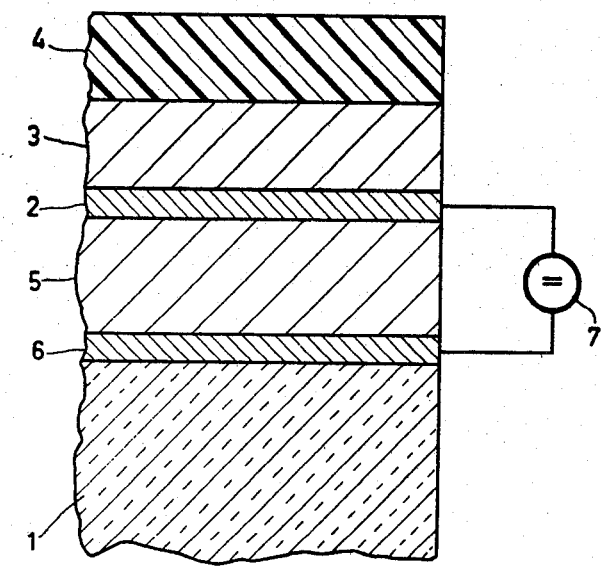

RECORD CARRIER FOR DEFORMATION IMAGES

This is a continuation of application Ser. No. 941,178, filed Sept. 11, 1978, now abandoned.

The invention relates to a record carrier for storing information in the form of deformation images, having a substrate on which is provided an electrode layer, a photoconductive layer and a thermoplastic layer.

Such record carriers are known, for example from Appl. Optics 9, 2088 (1970) and are distinguished by high resolution and sensitivity reversibility and in situ development. For storing information, the surface of the thermoplastic layer is charged to a given potential and exposed to the desired information pattern. A latent charge pattern is formed which is converted into a deformation image of the layer surface by heating the thermoplastic layer. The deformation image of the layer surface is fixed by subsequent cooling. The heating of the layer is usually produced by the Joulean heat of a current pulse which flows through the electrode layer. A longer lasting current pulse results in erasure of the information. A control is necessary which fixes the temporary position and length of the heating pulse for exposure.

German Pat. No. 23 35 230 discloses a record material for deformation images for recording and erasing partial images, in which two electrodes separated by an insulating layer are provided on a substrate, said electrodes each consisting of individual strips and forming a crossing grid pattern. If a suitable current pulse is passed only through one strip of each of the two electrodes, the thermoplastic layer is only heated at the crossing of the two strips to such a temperature that its surface can be deformed. The manufacture of such electrodes subdivided into strips with an intermediate insulating layer, however, is very expensive and the individual partial images cannot be below a certain size and a minimum distance from each other. When such record carriers are used for point memories or for side-oriented holographic memories with very small sub-patterns, however, it must be possible to store an erase many small partial images on a layer independently of each other.

It is the object of the invention to provide a record carrier which enables the storage of information on very small closely adjacent partial images. According to the invention this object is achieved in that the photoconductive layer is provided between the electrode layer and a further transparent electrode, the tansparent electrode being provided with the thermoplastic layer on the side remote from the photoconductive layer.

During the storing and erasing process the two electrodes are connected to a voltage source.

In the record carrier according to the invention the photoconductive layer is used quite differently from what was usual so far, namely to produce a heating pulse. This is carried out in that upon exposing the thermoplastic layer to a light spot of the size of the desired partial image, this light also falls through the transparent electrode on the adjacent photoconductor and makes it low-ohmic at the exposed site so that current can flow from the voltage source via one electrode and the low-ohmic site of the photoconductor to the other electrode and produces Joulean heat at said site which in the case of suitable proportioning of the parameters heats the thermoplastic layer above the softening temperature. Structuring of one the layers used or of the electrodes hence is not necessary since the confinement of the current flow occurs only by the exposure itself.

For producing a sufficient heat pulse with a relatively low voltage source, it is advantageous for the photoconductive layer to consist of a low-ohmic photoconductor. In this case sufficiently high currents flow already at low voltages and produce a sufficient heating. It is advantageous for the resistivity of the low-ohmic photoconductor to be between 0.1 and 10 ohm at an exposure with 1 W/cm$^2$. Such a radiation power is easily possible with a laser in particular in the case of very small partial images. It is advantageous for the low-ohmic photoconductor to consist of CdS which is doped with Cu. With such a photoconductor, the resistivity upon exposure with a given wavelength can be favorably adjusted.

The recording of information in such a record carrier for example, can be carried out in known manner in that the thermoplastic layer is charged in the desired places by means of an electron beam and the whole area is then exposed, so that the photoconductor becomes low-ohmic, Joulean heat is produced and the thermoplastic layer is heated above the softening temperature. Another possibility is to charge the whole surface of the thermoplastic layer and to expose it only in a point which is to represent an information bit so that the so-called "frost effect" in the form of an irregular microscopic deformation of the surface occurs, which can be read due to its scattering properties. Upon recording an information bit of opposite value, either the charge or the exposure can be suppressed so that no frost effect occurs in this place. However, in order to record an information pattern of a plurality of bits, espectively in the form of a hologram, it is advantageous that a further photoconductive layer is provided between the thermoplastic layer and the further transparent electrode. The further photoconductive layer which in the usual manner consists of a comparatively high-ohmic material may then also be combined with the thermoplastic layer, that is to say a thermoplastic layer having photoconductive properties is used.

An embodiment of the invention will now be described in greater detail, by way of example, with reference to the accompanying drawing, in which FIG. 1 is a cross-sectional view through the thermoplastic record carrier.

An electrode layer 6 is present on a substrate 1. The substrate 1 may be transparent to the radiation used for storing and reading so that in that case the electrode 6 is also transparent. On the other hand, however, the substrate may also be constructed so that its surface has reflecting properties, so that the radiation impinging on the succession of layers passes through said layers two times. This can also be achieved in that the electrode layer 6 is constructed so as to be reflective.

In the present case the substrate 1 consists of a polished glass plate and is hence transparent. The electrode 6 is also transparent and consists of a layer of In$_2$O$_3$/SnO$_2$ in a thickness of 80 nm.

A low-ohmic photoconductive layer 5 is provided on the electrode 6. This layer consists of CdS deposited from the gaseous phase and doped with approximately 100 ppm copper. Such a material has a resistivity of a few Ohm.cm upon exposure with an intensity of 1 W/cm$^2$. This layer is approximately 4 μm thick.

A transparent electrode 2 which is constructed as the electrode layer 6 is present on the said photoconductive layer 5. On said layer 2 a photoconductive layer 3 of a high-ohmic photoconductor is provided which contains 90% by weight of Polyvinylcarbazole and 10% by weight of trinitrofluorenone and has a thickness of approximately 0.7 μm. Photoconductive layer 3 is provided with a thermoplastic layer 4 in a thickness of approximately 0.4 μm. For said thermoplastic layer several known materials may be used, for example Staybelite Ester 10 (Hercules).

A voltage source 7 which gives a direct voltage of 10 V is connected to the electrodes 2 and 6.

Areas of approximately 30 μm diameter which were bounded by the expansion of the interference pattern to be recorded were exposed for 70 μsec with an intensity of 2 W/cm$^2$ at 633 nm so as to obtain the desired deformation image. This resulted in approximately the optimum efficiency in storing.

Thermoplastic layers which are charged and heated above the softening point show the so-called frost effect, that is, an irregular microscopic deformation of the surface which can be observed due to its scattering properties. This effect may also be used for storing binary information, in which each information bit represents a matrix point whose position is defined upon recording. For recording, the whole surface of the thermoplastic layer may be charged and when a binary information "1" is to be written in a given matrix point, said matrix point is then exposed, for example, as described above. For writing a binary "0" in a matrix point, the preceding charging or the subsequent exposure of said point or both are suppressed. As a result of this a matrix of memory cells is formed on the surface of the thermoplastic layer and may each assume either of the two conditions "surface with frost effect" or "surface without frost effect". For reading a matrix point, it is exposed to light of a given wavelength in which, however, the voltage source 7 is switched off, and the intensity of the reflected and scattered light, respectively, is measured and the value of the stored information is derived therefrom.

The thermoplastic record carrier according to the invention can hence be used in several manners in which each time the following advantage are maintained: the exposure produces the latent image in the mode of operation of usual thermoplastic layers, the exposure produces simultaneously the heat evolution and hence the development of the latent image, the heat evolution is automatically restricted to the exposed area.

A longer lasting exposure hence results in erasing the information in the exposed area.

What is claimed is:

1. A record carrier for storing information comprising a substrate, a first electrode disposed on said substrate, a second, transparent electrode spaced from said first electrode, a photoconductive layer disposed between said first and second electrodes, said photoconductive layer being the only layer provided between said electrodes, and a thermoplastic layer disposed on the side of said second electrode remote from said photoconductive layer so that when said electrodes are connected to a voltage source and a region of said record carrier is exposed to radiation, due to decrease in the resistance of said photoconductive layer in the exposed region, current flowing through said region and between said electrodes heats an area of said thermoplastic layer opposite said exposed region.

2. The record carrier according to claim 1 wherein said photoconductive layer is low-ohmic.

3. The record carrier according to claim 2 wherein the resistivity of said photoconductive layer is between 0.1 and 10 ohms at an exposure of 1 W/cm$^2$.

4. The record carrier according to claim 2 wherein said photoconductive layer is comprised of CdS which is doped with Cu.

5. The record carrier according to claim 1 including a further photoconductive layer disposed between said thermoplastic layer and said second electrode.

6. The record carrier according to claims 1 or 5 wherein said substrate and said first electrode are transparent.

7. The record carrier according to claim 1 wherein said first electrode is reflective.

* * * * *